Aug. 29, 1933.  L. E. LA BRIE  1,924,611
BRAKE OPERATING MECHANISM
Filed Nov. 28, 1930

INVENTOR.
LUDGER E. LA BRIE
BY M. W. McConkey
ATTORNEY

UNITED STATES PATENT OFFICE 1,924,611

BRAKE OPERATING MECHANISM

Ludger E. La Brie, South Bend, Ind., assignor to Bendix Brake Company, South Bend, Ind., a corporation of Illinois Application November 28, 1930
Serial No. 498,621

8 Claims. (Cl. 188—10)

This invention relates to brakes and is illustrated as embodied in a novel operating mechanism for a system of four-wheel brakes for an automobile. An object of the invention is to simplify the operating mechanism by eliminating the usual transverse rock shafts and their associated parts.

Having this object in mind, I prefer to utilize tension connections from the four brakes, the connections from the left front and left rear brakes being operated by a device such as a bell crank lever and the connections from the right front and right rear brakes being connected to another similar device such as another bell crank lever. The two bell crank levers may be arranged side by side and operated by a pedal or other driver-controlled lever and are preferably arranged to be operated independently either by the foot pedal or its equivalent or by the emergency hand lever or its equivalent.

In order to avoid complications due to relative movement of the parts of the vehicle, I prefer to provide the connection to each brake with a flexible Bowden conduit mounted on the brake at one end and on the chassis frame adjacent its transverse center line at the other end, the ends of the four conduits at the center of the vehicle being preferably turned inwardly toward the longitudinal center line of the vehicle so that the tension cables are directed to the bell crank levers described above.

Figure 1:
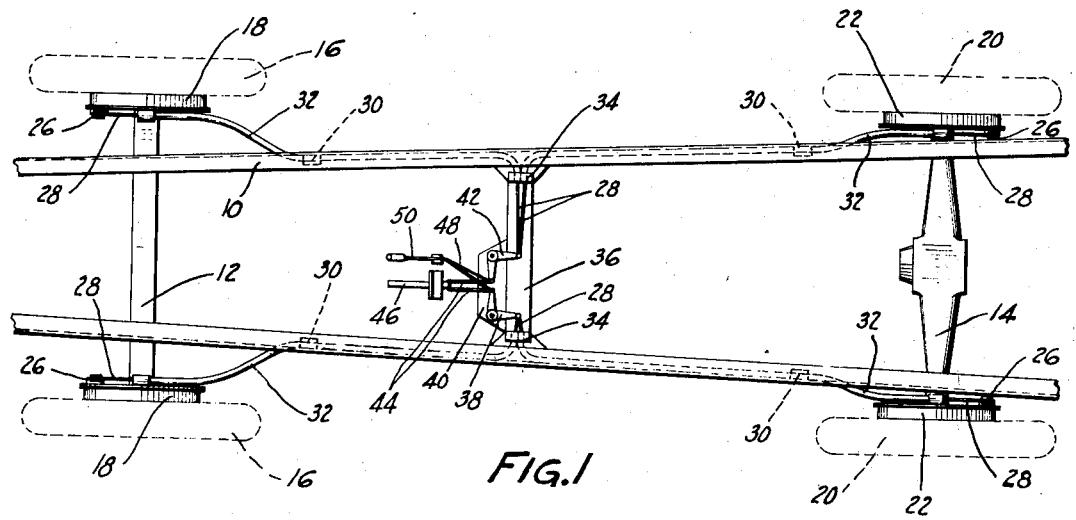
Figure 2:
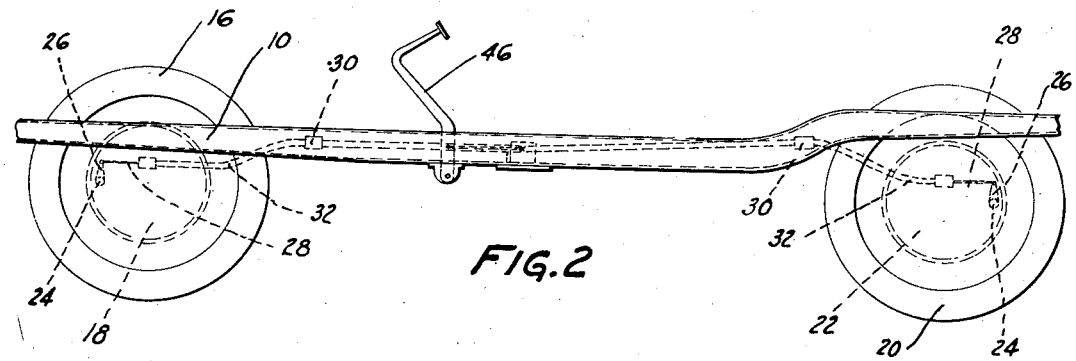

The above and other objects and features of the invention, including various novel and desirable details of construction and arrangement, will be apparent from the following description of one illustrative embodiment shown in the accompanying drawing, in which:

Figure 1 is a diagrammatic top plan view of an automobile chassis having a brake operating hookup arranged according to my invention; and Figure 2 is a diagrammatic longitudinal section showing the parts of Figure 1 in side elevation, but with the left front and left rear wheels removed.

The chassis illustrated includes the usual chassis frame 10 supported by the usual springs upon a front axle 12 and a rear axle 14 which are in turn supported by front road wheels 16 having brakes 18 and by rear road wheels 20 having brakes 22. The brakes themselves form no part of the present invention and may be of any desired type. Each of them is shown as having a cam shaft 24 with an operating lever 26.

According to the present invention, each of the levers 26, or the equivalent operating part, is operated by a tension cable 28 or the like extending toward the transverse center line of the vehicle. The cables 28 extend through flexible Bowden conduits 32 secured to the brakes 18 at their outer ends and having fittings 30 securing them to the chassis frame 10 opposite the rear ends of the front springs and the front ends of the rear springs. The inner ends of the conduits 32 (i. e. the ends opposite the brakes) are directed inwardly toward the longitudinal center line of the vehicle and secured by fittings 34 or the like to a transverse member 36 forming part of the chassis frame. This directs the ends of the cables 28 toward the longitudinal center line of the vehicle.

The cable 28 from the left front and left rear brakes are both connected to one arm of the bell crank lever 38 pivoted on a bracket 40 secured to the cross member 36, while the cables from the right front and right rear brakes are both connected to a similar bell crank lever 42 also pivotally fulcrumed on the bracket 40. Both of the bell crank levers 38 and 42 are connected by means such as cables or brake rods 44 to the usual brake pedal 46 or its equivalent, and are preferably also connected independently by means such as cables 48 to the usual hand emergency lever 50 or its equivalent. If the connections 44 and 48 are not flexible connections such as cables which permit the pedal and hand lever to operate independently of each other, suitable overrunning joints may be provided so that independence of operation is secured.

While one illustrative embodiment of the invention has been described in detail, it is not my intention to limit its scope to that particular embodiment or otherwise than by the terms of the appended claims.

I claim:

1. A vehicle having front wheels with brakes and rear wheels with brakes, in combination with operating means for the brakes including tension cables extending toward the lateral center of the vehicle from the brakes, a lever connected to both of the righthand cables, a lever connected to both of the lefthand cables, and two operating levers independently connected to both of the above-described levers.

2. A vehicle having a pair of front wheels provided with brakes and a pair of rear wheels provided with brakes, a flexible conduit supported at one end by each of said brakes and each having its opposite end supported at the side of the vehicle adjacent the transverse center line and directed inwardly toward the longitudinal center line of the vehicle, a tension operating element connected at one end to each brake and extending through the corresponding conduit and having its other end extending transversely toward the longitudinal center line of the vehicle, a bell crank lever connected to both of the tension elements from the left front and left rear brakes, another bell crank lever connected to both of the tension elements from the right front and right rear brakes, and an operating lever connected to both of the bell crank levers.

3. A vehicle having a pair of front wheels provided with brakes and a pair of rear wheels provided with brakes, a flexible conduit supported at one end by each of said brakes and each having its opposite end supported at the side of the vehicle adjacent the transverse center line and directed inwardly toward the longitudinal center line of the vehicle, a tension operating element connected at one end to each brake and extending through the corresponding conduit and having its other end extending transversely toward the longitudinal center line of the vehicle, and operating means connected to the transversely-extending ends of the cables.

4. A vehicle having a pair of front wheels provided with brakes and a pair of rear wheels provided with brakes, a flexible conduit supported at one end by each of said brakes and each having its opposite end supported at the side of the vehicle adjacent the transverse center line and directed inwardly toward the longitudinal center line of the vehicle, a tension operating element connected at one end to each brake and extending through the corresponding conduit and having its other end extending transversely toward the longitudinal center line of the vehicle, an operating device connected to both of the tension elements from the left front and left rear brakes, another operating device connected to both of the tension elements from the right front and right rear brakes, and an operating lever connected to both of the operating devices.

5. A vehicle having a pair of front wheels provided with brakes and a pair of rear wheels provided with brakes, a flexible conduit supported at one end by each of said brakes and each having its opposite end supported at the side of the vehicle adjacent the transverse center line and directed inwardly toward the longitudinal center line of the vehicle, a tension operating element connected at one end to each brake and extending through the corresponding conduit and having its other end extending transversely toward the longitudinal center line of the vehicle, an operating device connected to both of the tension elements from the left front and left rear brakes, another operating device connected to both of the tension elements from the right front and right rear brakes, and two operating levers independently connected to both of the operating devices.

6. A vehicle having a pair of front wheels provided with brakes; a pair of rear wheels provided with brakes; flexible conduits for each of said brakes, each conduit being supported at one end by its associated brake and having its opposite end supported at a side of the vehicle at a point adjacent to the transverse center line and directed inwardly therefrom toward the longitudinal center line of the vehicle; a tension operating element for each of said brakes, each tension operating element being connected at one end to its associated brake, extending through the corresponding conduit, and having its other end extending transversely toward the longitudinal center line of the vehicle; and an operating lever connected to all of said cables.

7. A vehicle having a pair of front wheels provided with brakes; a pair of rear wheels provided with brakes; a flexible conduit for each of said brakes, each conduit being supported at one end by its associated brake and having the opposite end supported at the side of the vehicle at a point adjacent to the transverse center line and directed inwardly therefrom toward the longitudinal center line of the vehicle; a tension operating element for each of said brakes, each tension operating element being connected at one end to its associated brake, extending through the corresponding conduit, and having its other end extending transversely toward the longitudinal center line of the vehicle; a bell crank lever connected to the tension elements from the left front and left rear brake; another bell crank lever connected to the tension elements from the right front and right rear brake; and an operating lever connected to both bell crank levers.

8. A vehicle having a pair of front wheels provided with brakes; a pair of rear wheels provided with brakes; a flexible conduit for each of said brakes, each conduit being supported at one end by its associated brake and having its opposite end supported at the side of the vehicle at a point adjacent to the transverse center line and directed inwardly therefrom toward the longitudinal center line of the vehicle, a tension operating element for each of said brakes each tension operating element being connected at one end to its associated brake, extending through the corresponding conduit, and having its opposite end extending transversely toward the longitudinal center line of the vehicle; and means for operating all of said tension elements.

LUDGER E. LA BRIE.